United States Patent
McMahan et al.

(10) Patent No.: US 12,448,140 B2
(45) Date of Patent: Oct. 21, 2025

(54) PRESSURE RELIEF LATCH

(71) Applicant: Rohr, Inc., Chula Vista, CA (US)

(72) Inventors: Paul F. McMahan, College Station, TX (US); Braskel Phillips, San Diego, CA (US)

(73) Assignee: ROHR, INC., Chula Vista, CA (US)

( * ) Notice: Subject to any disclaimer, the term of this patent is extended or adjusted under 35 U.S.C. 154(b) by 233 days.

(21) Appl. No.: 18/141,855

(22) Filed: May 1, 2023

(65) Prior Publication Data
US 2024/0367805 A1    Nov. 7, 2024

(51) Int. Cl.
*B64D 29/06* (2006.01)
*E05C 3/12* (2006.01)
*E05C 3/30* (2006.01)

(52) U.S. Cl.
CPC .............. *B64D 29/06* (2013.01); *E05C 3/122* (2013.01); *E05C 3/30* (2013.01)

(58) Field of Classification Search
CPC ... E05C 3/122; E05C 3/03; E05C 3/30; E05C 3/24; E05C 3/162; E05C 19/02; E05C 19/024; E05C 19/04; E05C 19/145; E05C 19/12; E05C 19/14; E05C 19/06; E05C 19/063; E05B 51/023; E05B 5/00; E05B 41/00; B64D 29/06; B64D 29/00; B64C 2001/009; B64C 1/1407; Y10T 292/0915
See application file for complete search history.

(56) References Cited

U.S. PATENT DOCUMENTS

| | | | | |
|---|---|---|---|---|
| 3,259,411 | A * | 7/1966 | Griffiths | E05C 19/145 292/DIG. 31 |
| 4,188,054 | A * | 2/1980 | La Marca | E05B 17/0033 292/226 |
| 4,743,052 | A * | 5/1988 | Stammreich | E05C 19/145 292/113 |
| 6,155,616 | A * | 12/2000 | Akright | E05B 5/00 292/202 |
| 6,513,841 | B1 * | 2/2003 | Jackson | E05B 5/00 292/79 |
| 6,755,448 | B2 | 6/2004 | Jackson | |
| 10,352,074 | B2 * | 7/2019 | Hernandez | B64D 29/06 |

(Continued)

FOREIGN PATENT DOCUMENTS

| | | | | |
|---|---|---|---|---|
| DE | 3031122 C2 * | 10/1990 | | E05C 19/14 |
| DE | 60217790 T2 * | 11/2007 | | D06F 39/14 |

(Continued)

*Primary Examiner* — Steven A Tullia
(74) *Attorney, Agent, or Firm* — Getz Balich LLC (57) ABSTRACT

A pressure relief latch includes a housing, a bolt, a cam, and a spring assembly. The housing includes a door panel, a first lateral panel, and a second lateral panel. The first lateral panel and the second lateral panel extend outward from the door panel. The bolt includes a bolt body and a roller bearing. The bolt body is pivotably mounted to the first lateral panel and the second lateral panel at a bolt pivot axis. The bolt body is pivotable about the bolt pivot axis between a latched position and an unlatched position. The roller bearing is rotatably mounted to the bolt body. The cam is pivotably mounted to the first lateral panel and the second lateral panel. The spring assembly is pivotably mounted to the cam. The spring assembly is configured to bias the cam toward the bolt.

17 Claims, 8 Drawing Sheets

(56) References Cited

U.S. PATENT DOCUMENTS

| | | |
|---|---|---|
| 10,435,929 B2 | 10/2019 | Do |
| 10,604,977 B2 | 3/2020 | Do |
| 2012/0242096 A1* | 9/2012 | Rozema .............. E05B 63/0069 |
| | | 292/202 |
| 2012/0242097 A1* | 9/2012 | Hernandez ............. B64D 29/06 |
| | | 292/228 |
| 2013/0043350 A1* | 2/2013 | Defrance .............. E05B 51/023 |
| | | 244/131 |
| 2014/0035296 A1* | 2/2014 | Jackson .................. E05C 19/02 |
| | | 292/194 |
| 2015/0232189 A1* | 8/2015 | Hernandez ................ E05C 3/08 |
| | | 292/200 |
| 2020/0095806 A1* | 3/2020 | Diaz ..................... E05B 51/023 |
| 2020/0355124 A1 | 11/2020 | Mcmahan |

FOREIGN PATENT DOCUMENTS

| | | | | |
|---|---|---|---|---|
| EP | 1371796 A2 * | 12/2003 | ............. | D06F 37/42 |
| EP | 1597998 A2 * | 11/2005 | ......... | A47L 15/4259 |
| EP | 2551199 A1 * | 1/2013 | ............. | B64D 29/06 |
| EP | 2507451 B1 * | 11/2019 | ............. | B64D 29/06 |
| FR | 2934244 A1 * | 1/2010 | ............. | B64C 25/26 |
| SE | 1250110 A1 * | 8/2013 | ............. | E05B 83/24 |

\* cited by examiner

PRESSURE RELIEF LATCH

BACKGROUND

1. Technical Field

This disclosure relates generally to aircraft propulsion system compartment pressure relief assemblies, and more particularly to pressure relief latches.

2. Background Information

An aircraft propulsion system includes one or more cowls (e.g., a core cowl, a fan cowl, a thrust reverser cowl, etc.) which form exterior housings of one or more portions of the propulsion system. The cowl may form an exterior boundary of one or more compartments of the propulsion system. Compartment structural materials and/or components may be subject hazardous conditions in the event of an increase in compartment pressure beyond compartment design considerations. Such over-pressure events can result from a number of circumstances. For example, the cowl may enclose other propulsion system accessories, such as pressurized air (e.g., compressor bleed air) lines or ducts, which may be disposed within the compartment. The fluids contained within these lines may have high temperatures and pressures which, if exposed to structural materials or components within the compartment, may cause damage to the structural materials or components. Various compartment pressure relief assemblies are known in the art. While these known pressure relief assemblies have various advantages, there is still room in the art for improvement.

SUMMARY

It should be understood that any or all of the features or embodiments described herein can be used or combined in any combination with each and every other feature or embodiment described herein unless expressly noted otherwise.

According to an aspect of the present disclosure, a pressure relief latch includes a housing, a bolt, a cam, and a spring assembly. The housing includes a door panel, a first lateral panel, and a second lateral panel. The door panel forms a bolt slot. The first lateral panel and the second lateral panel extend outward from the door panel. The bolt includes a bolt body and a roller bearing. The bolt body is pivotably mounted to the first lateral panel and the second lateral panel at a bolt pivot axis. The bolt body is pivotable about the bolt pivot axis between a latched position and an unlatched position. The bolt body is configured to pass through the bolt slot between the latched position and the unlatched position. The roller bearing is rotatably mounted to the bolt body about a rotational axis. The cam is pivotably mounted to the first lateral panel and the second lateral panel at a first cam pivot axis. The spring assembly is pivotably mounted to the cam at a second cam pivot axis. The spring assembly is configured to bias the cam toward the bolt with the cam positioned in contact with the roller bearing in the latched position of the bolt body.

In any of the aspects or embodiments described above and herein, the bolt body may form a cavity and the roller bearing may be disposed within the cavity.

In any of the aspects or embodiments described above and herein, the bolt body may include a first lateral side wall, a second lateral side wall, and a laterally-extending wall forming the cavity. The laterally-extending wall may extend between and to the first lateral side wall and the second lateral side wall. The roller bearing may be rotatably mounted to the first lateral side wall and the second lateral side wall.

In any of the aspects or embodiments described above and herein, the spring assembly may be configured to bias the cam toward the bolt with the cam positioned in contact with the roller bearing and the laterally-extending wall in the latched position of the bolt body.

In any of the aspects or embodiments described above and herein, the cam may include a first surface portion, a second surface portion, and an actuation edge. The first surface portion may intersect the second surface portion at the actuation edge. The spring assembly may be configured to bias the cam toward the bolt with the first surface portion positioned in contact with the roller bearing and the second surface portion positioned in contact with the laterally-extending wall in the latched position of the bolt body.

In any of the aspects or embodiments described above and herein, the cam may include a first surface portion, a second surface portion, and an actuation edge. The first surface portion may intersect the second surface portion at the actuation edge. The spring assembly may be configured to bias the cam toward the bolt with the first surface portion positioned in contact with the roller bearing in the latched position of the bolt body.

In any of the aspects or embodiments described above and herein, the first surface portion may have a concave shape and the second surface portion may have a convex shape.

In any of the aspects or embodiments described above and herein, the actuation edge may have a substantially orthogonal shape.

In any of the aspects or embodiments described above and herein, the spring assembly may include a shaft, a trunnion, and a spring. The shaft may be pivotably mounted to the cam about the second cam pivot axis. The trunnion may be pivotably mounted to the first lateral panel and the second lateral panel at a trunnion pivot axis. The shaft may be mounted to the trunnion. The spring may extend circumferentially about the shaft and the trunnion.

In any of the aspects or embodiments described above and herein, the shaft may be movably mounted to the trunnion such that the shaft is configured to translate relative to and within the trunnion.

In any of the aspects or embodiments described above and herein, the spring assembly may further include an adjustment nut. The adjustment nut may be selectively positionable on the trunnion. The spring may be compressed against the adjustment nut.

In any of the aspects or embodiments described above and herein, the roller bearing may be configured to push the cam to compress the spring as the bolt body pivots from the latched position to the unlatched position.

According to another aspect of the present disclosure, a pressure relief latch includes a housing, a bolt, and a cam. The housing includes a door panel, a first lateral panel, and a second lateral panel. The first lateral panel and the second lateral panel extend outward from the door panel. The bolt includes a bolt body and a roller bearing. The bolt body is pivotably mounted to the first lateral panel and the second lateral panel at a bolt pivot axis. The bolt body is pivotable about the bolt pivot axis between a latched position and an unlatched position. The roller bearing is rotatably mounted to the bolt body about a rotational axis. The cam forms a cam side surface. The cam side surface includes a first surface portion, a second surface portion, and an actuation edge. The first surface portion intersects the second surface portion at the actuation edge. The roller bearing is positioned to roll along the first surface portion, over the actuation edge, and onto the second surface portion as the bolt body pivots from the latched position to the unlatched position.

In any of the aspects or embodiments described above and herein, the pressure relief latch may further include a spring assembly including a spring. The spring may be configured to bias the cam toward the bolt. The roller bearing may be positioned to push the cam to compress the spring as the roller bearing rolls along the first surface portion to the actuation edge.

In any of the aspects or embodiments described above and herein, the actuation edge may have a substantially orthogonal shape.

In any of the aspects or embodiments described above and herein, the first surface portion may have a concave shape and the second surface portion may have a convex shape.

According to another aspect of the present disclosure, a propulsion system for an aircraft includes a cowl, a pressure relief door, and a pressure relief latch. The cowl forms a compartment. The pressure relief door is pivotably mounted to the cowl. The pressure relief door is pivotable between a closed position and an open position. The pressure relief door further forms the compartment. The pressure relief latch includes a housing, a bolt, a cam, and a spring assembly. The housing includes a door panel, a first lateral panel, and a second lateral panel. The door panel is mounted to the pressure relief door. The first lateral panel and the second lateral panel extend outward from the door panel. The bolt includes a bolt body and a roller bearing. The bolt body is pivotably mounted to the first lateral panel and the second lateral panel at a bolt pivot axis. The bolt body is pivotable about the bolt pivot axis between a latched position and an unlatched position. In the latched position, the bolt body is configured to contact the cowl. The roller bearing is rotatably mounted to the bolt body about a rotational axis. The cam is pivotably mounted to the first lateral panel and the second lateral panel at a first cam pivot axis. The cam is biased toward the bolt with the cam positionable in contact with the roller bearing in the latched position of the bolt body.

In any of the aspects or embodiments described above and herein, the bolt body may extend between and to a first longitudinal side and a second longitudinal side. The bolt body may include a first engagement surface and a second engagement surface. The first engagement surface may be disposed at the first longitudinal side. The second engagement surface may be disposed at the second longitudinal side. In the latched position of the bolt body, the first engagement surface is configured to contact the cowl and the second engagement surface is configured to be disposed at the pressure relief door.

In any of the aspects or embodiments described above and herein, the bolt body may be configured to pass through the pressure relief door as the bolt body pivots from the latched positioned to the unlatched position.

In any of the aspects or embodiments described above and herein, the pressure relief latch further may include a spring assembly. The spring assembly may be configured to bias the cam toward the bolt.

The present disclosure, and all its aspects, embodiments and advantages associated therewith will become more readily apparent in view of the detailed description provided below, including the accompanying drawings.

DETAILED DESCRIPTION

Figure 1:
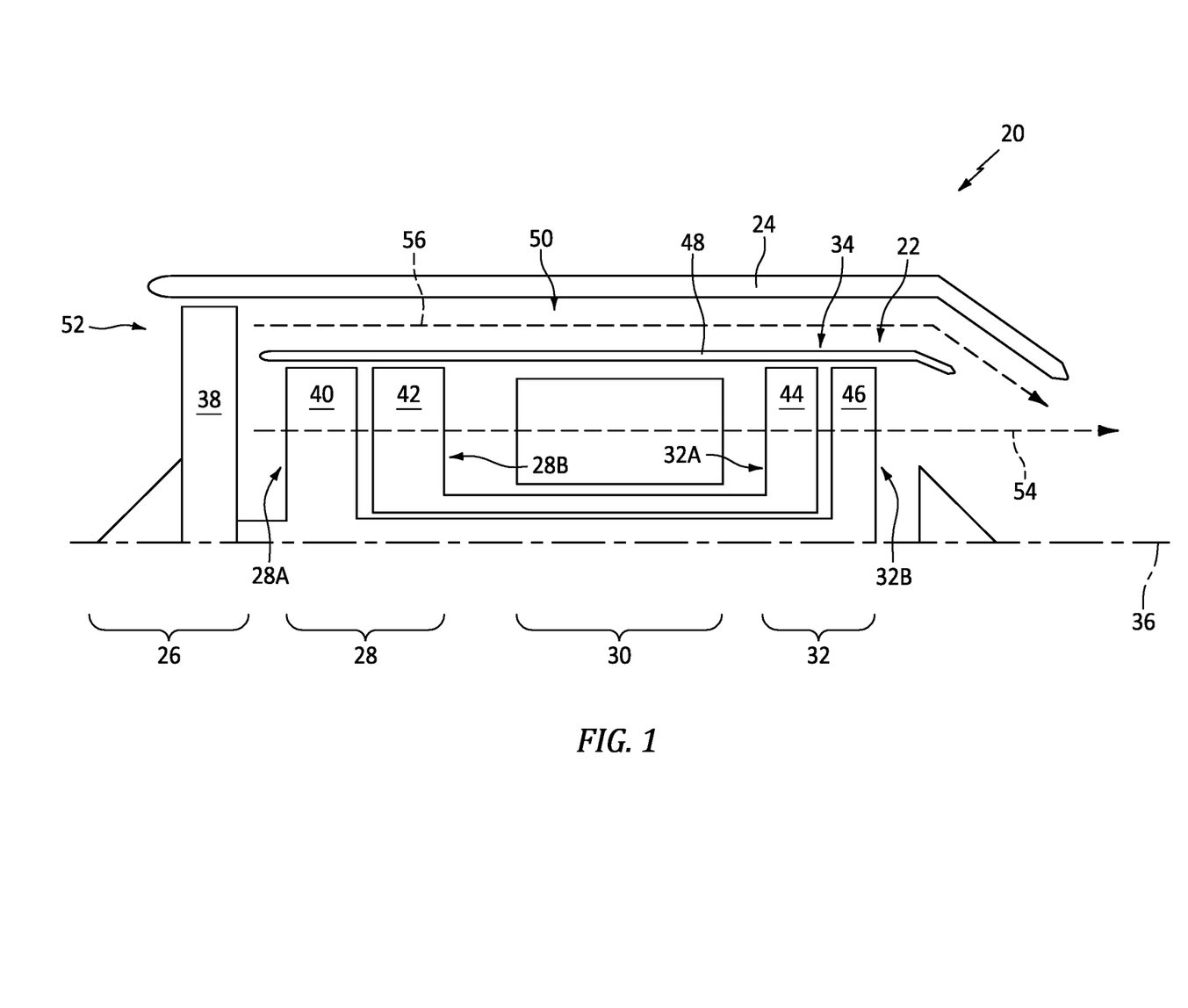
FIG. 1 illustrates a side, cutaway view of a propulsion system for an aircraft, in accordance with one or more embodiments of the present disclosure.

FIG. 1 illustrates a propulsion system 20 for an aircraft. Briefly, the aircraft may be a fixed-wing aircraft (e.g., an airplane), a rotary-wing aircraft (e.g., a helicopter), a tilt-rotor aircraft, a tilt-wing aircraft, or another aerial vehicle. Moreover, the aircraft may be a manned aerial vehicle or an unmanned aerial vehicle (UAV, e.g., a drone). However, the present disclosure is not limited to any particular application of the engine assembly 10. The propulsion system 20 of FIG. 1 includes a gas turbine engine 22 and a nacelle 24.

The gas turbine engine 22 of FIG. 1 is configured as a multi-spool turbofan gas turbine engine. The gas turbine engine 22 of FIG. 1 includes a fan section 26, a compressor section 28, a combustor section 30, a turbine section 32, and an engine static structure 34. The gas turbine engine 22 sections 26, 28, 30, and 32, of FIG. 1 are arranged sequentially along an axial centerline 36 (e.g., a rotational axis) of the gas turbine engine 22. The compressor section 28 may include a low-pressure compressor (LPC) section 28A and a high-pressure compressor (HPC) section 28B. The turbine section 32 may include a high-pressure turbine (HPT) section 32A and a low-pressure turbine (LPT) section 32B. The present disclosure, however, is not limited to the particular gas turbine engine 22 configuration of FIG. 1. For example, aspects of the present disclosure may also be applicable to propulsion system gas turbine engines having single-spool and three-spool configurations.

Each of the gas turbine engine 22 sections 26, 28A, 28B, 32A, and 32B includes a bladed rotor 38, 40, 42, 44, 46. The fan rotor 38 and the LPC rotor 40 are connected to and driven by the LPT rotor 46 through a low-speed shaft. The HPC rotor 42 is connected to and driven by the HPT rotor 44 through a high-speed shaft. The shafts are concentrically disposed relative to the axial centerline 36 and configured for rotation about the axial centerline 36 relative to the engine static structure 34. The shafts are rotatably supported by a plurality of bearings assemblies (not shown). Each of these bearing assemblies is formed by or otherwise connected to the engine static structure 34.

The engine static structure 34 of FIG. 1 includes a core cowl 48. The core cowl 48 extends circumferentially about (e.g., completely around) the axial centerline 36. The core cowl 48 extends generally axially to surround and house the gas turbine engine 22 sections 28, 30, and 32. The core cowl 48 may form at least a portion of a bypass duct 50 radially outward of the core cowl 48 (e.g., radially between the core cowl 48 and the nacelle 24). The engine static structure 34 may additionally include one or more engine cases, bearing assemblies, and/or other structural components of the gas turbine engine 22 which house, structurally support, and/or rotationally support components of the engine sections 26, 28, 30, and 32.

The nacelle 24 of FIG. 1 extends circumferentially about (e.g., completely around) the axial centerline 36. The nacelle 24 extends generally axially to surround and house the gas turbine engine 22. The nacelle 24 may form at least a portion of a bypass duct 50 radially inward of the nacelle 24. The nacelle 24 forms an exterior housing of the propulsion system 20.

During operation, air enters the propulsion system 20 through an air inlet 52 of the propulsion system 20. This air is directed through the fan section 26 into a (e.g., annular) core flowpath 54 and the bypass flowpath 56. The core flowpath 54 extends axially along the axial centerline 36 within the propulsion system 20 and through the engine sections 28, 30, and 32. The bypass flowpath 56 extends axially along the axial centerline 36 and through the bypass duct 50. The air within the core flowpath 54 may be referred to as "core air." The air within the bypass flowpath 56 may be referred to as "bypass air."

The core air is compressed by the LPC rotor 40 and the HPC rotor 42 and directed into a combustion chamber of a combustor (e.g., an annular combustor) in the combustor section 30. Fuel is injected into the combustion chamber through one or more fuel injectors and mixed with the compressed core air to provide a fuel-air mixture. This fuel-air mixture is ignited and combustion products thereof flow through and sequentially cause the HPT rotor 44 and the LPT rotor 46 to rotate. The rotation of the HPT rotor 44 and the LPT rotor 46 respectively drive rotation of the HPC rotor 42 and the LPC rotor 40 and, thus, compression of the air received from the air inlet 52. The rotation of the LPT rotor 46 also drives rotation of the fan rotor 38, which fan rotor 38 propels bypass air through and out of the bypass flowpath 56.

Figure 2:
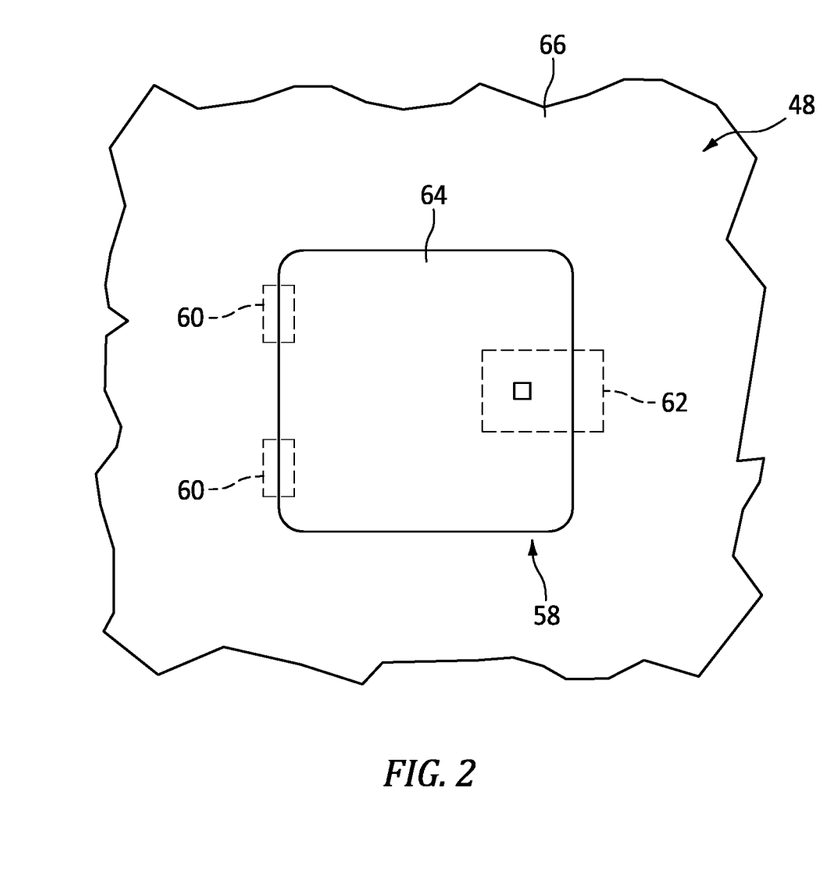
FIG. 2 illustrates an exterior view of a portion of a gas turbine engine core cowl including a pressure relief door, in accordance with one or more embodiments of the present disclosure.

FIG. 2 illustrates an exterior portion (e.g., an outer radial side) of the core cowl 48. The core cowl 48 may include one or more pressure relief doors 58 configured to release high-pressure and/or high-temperature gas from a compartment of the gas turbine engine 22 (see FIG. 1), for example, during a burst duct event. The compartment may be formed, at least in part, by the core cowl 48 and the pressure relief door 58 (e.g., radially inward of the core cowl 48 and the pressure relief door 58). In some embodiments, a plurality of pressure relief doors 58 may be distributed (e.g., circumferentially distributed) about the core cowl 48. The pressure relief door 58 is movable relative to the core cowl 48 between a closed position and an open position. For example, the pressure relief door 58 may be pivotably mounted to the core cowl 48 by one or more hinges 60. As will be discussed in further detail, the pressure relief door 58 may be configured to rotate from the closed position to the open position in response to an elevated internal pressure in the compartment at or above a typical compartment pressure. The pressure relief door 58 includes a pressure relief latch 62 configured to selectively permit the pressure relief door 58 to rotate from the closed position to the open position when the internal pressure in the compartment is at or above an actuation pressure (e.g., an unlatching pressure) for the pressure relief latch 62.

As used herein, the "closed position" will be used to refer to the pressure relief door 58 in a position such that an exterior surface 64 of the pressure relief door 58 is disposed coincident with an exterior surface 66 with the core cowl 48 (e.g., the pressure relief door 58 is in a normal position for operation of the gas turbine engine 22, however, minor gaps or radial misalignment within design tolerances may exist between the pressure relief door 58 and the core cowl 48). As used herein, the "open position" will be used to refer to the pressure relief door 58 in a position other than the closed position (e.g., the pressure relief door 58 is partially open, fully open, etc.). While the pressure relief door 58 and its pressure relief latch 62 are described herein with respect to the core cowl 48 for the gas turbine engine 22, it should be understood that aspects of the present disclose may be directed to pressure relief doors and pressure relief latches for other propulsion system sections and components such as, but not limited to, propulsion system nacelles, gas turbine engine compartments, and propulsion system thrust reversers, where pressure relief may be desirable. Moreover, while the present disclosure is described with respect to the aircraft propulsion system 20 and its gas turbine engine 22, it should be understood that the present disclosure is not limited to use in gas turbine engines or aircraft and may be applied to any other suitable vehicle, industrial application, or environment where compartment pressure relief is desirable.

Figure 3:
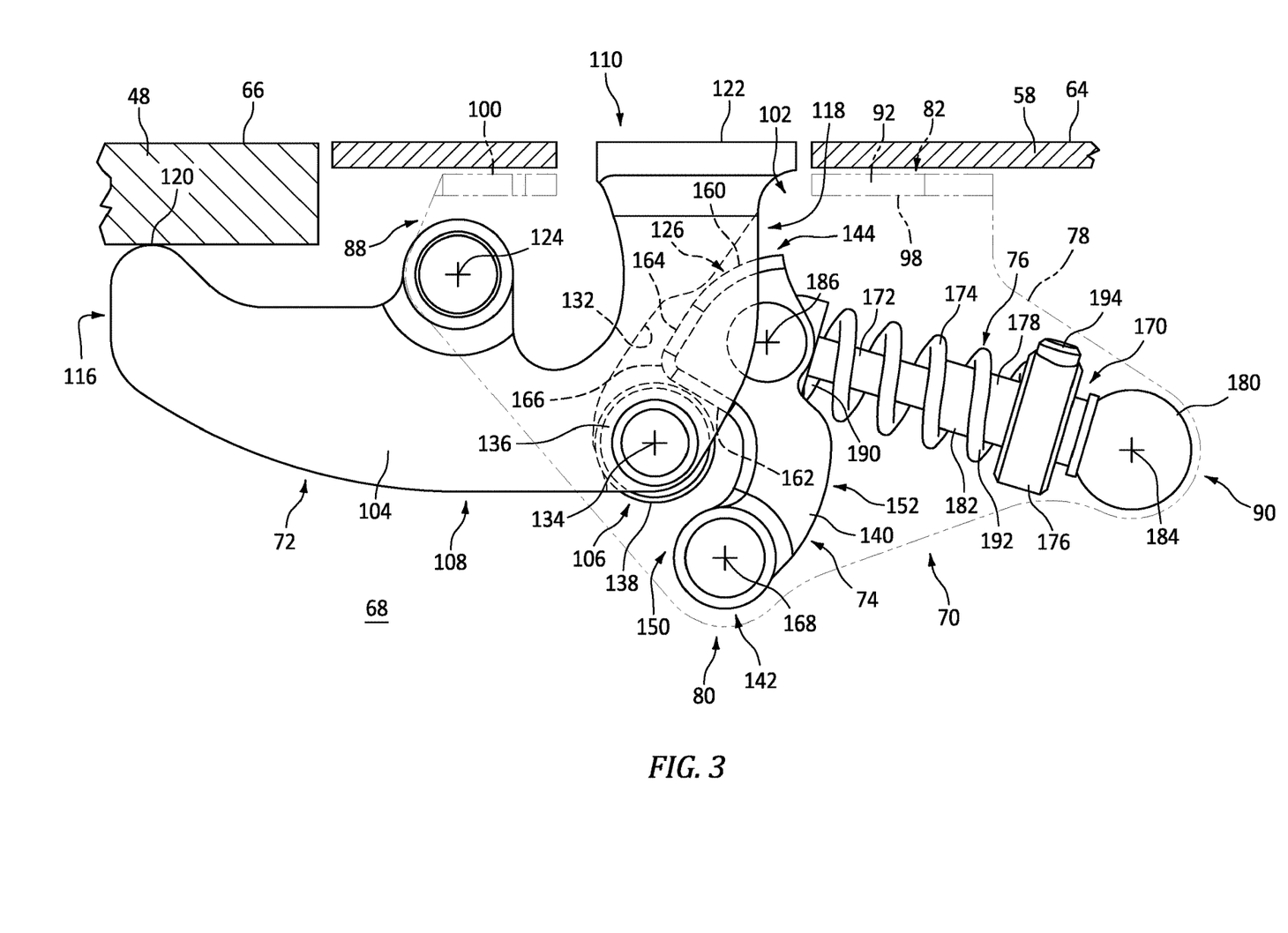
FIG. 3 illustrates a side, cutaway view of a pressure relief latch in a latched condition, in accordance with one or more embodiments of the present disclosure.

Referring to FIGS. 3-6, aspects of the pressure relief latch 62 will be discussed in greater detail. FIG. 3 illustrates a side cutaway view of the pressure relief latch 62 and portions of the core cowl 48 and the pressure relief door 58. The core cowl 48 and the pressure relief door 58 of FIG. 3 form a compartment 68. The pressure relief door 58 of FIG. 3 is in the closed position to seal or otherwise enclose the compartment 68. The pressure relief latch 62 is mounted to the pressure relief door 58 and positioned at (e.g., on, adjacent, or proximate) the core cowl 48. The pressure relief latch 62 includes a housing 70, a bolt 72, a cam 74, and a spring assembly 76.

Figure 4:
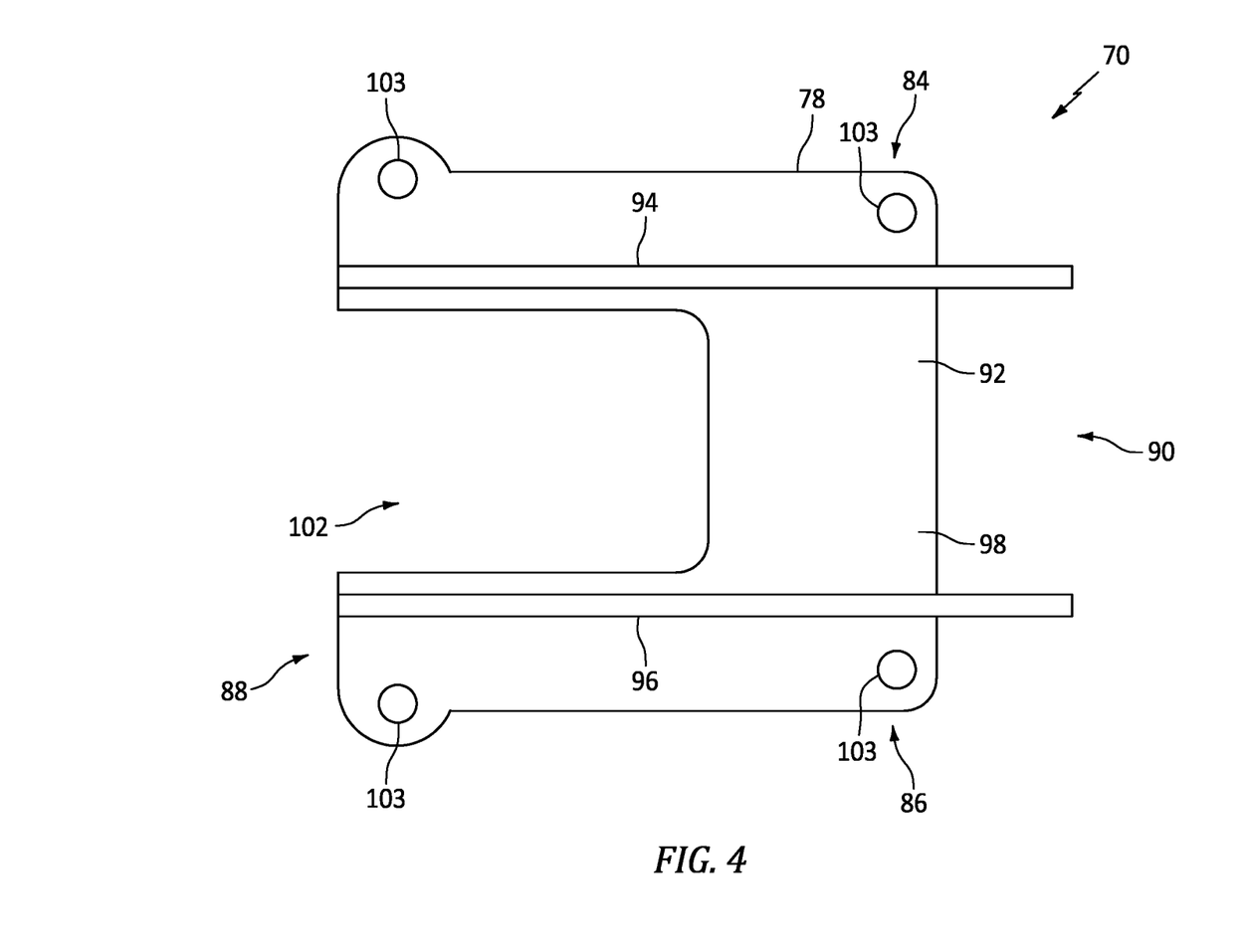
FIG. 4 a view of a housing for the pressure relief latch of FIG. 3, in accordance with one or more embodiments of the present disclosure.

FIGS. 3 and 4 illustrate portions of the housing 70. The housing 70 includes a housing body 78. The housing body 78 extends between and to an inner end 80 of the housing body 78 and an outer end 82 of the housing body 78. The housing body 78 extends between and to a first lateral side 84 of the housing body 78 and a second lateral side 86 of the housing body 78. The housing body 78 extends between and to a first longitudinal side 88 of the housing body 78 and a second longitudinal side 90 of the housing body 78. The housing body 78 includes a door panel 92, a first lateral panel 94, and a second lateral panel 96.

The door panel 92 is disposed at (e.g., on, adjacent, or proximate) and extends along the outer end 82. The door panel 92 extends between and to the first lateral side 84 and the second lateral side 86. The door panel 92 further extends from the first longitudinal side 88 toward or to the second longitudinal side 90. The door panel 92 includes an inner side surface 98 and an outer side surface 100 opposite the inner side surface 98. The outer side surface 100 is mounted to or otherwise disposed at (e.g., on, adjacent, or proximate) the pressure relief door 58. The door panel 92 forms a bolt slot 102 at (e.g., on, adjacent, or proximate) the first longitudinal side 88. The bolt slot 102 extends through the door panel 92 from the inner side surface 98 to the outer side surface 100. The bolt slot 102 extends through the door panel 92 from the first longitudinal side 88 toward the second longitudinal side 90. The bolt slot 102 is spaced from (e.g., laterally spaced from) the first lateral side 84 and the second lateral side 86. The door panel 92 may form one or more fastener apertures 103 extending through the door panel 92 from the inner side surface 98 to the outer side surface 100. The fastener apertures 103 may facilitate mounting of the pressure relief latch 62 to the pressure relief door 58, for example, using one or more respective mechanical fasteners (not shown).

The first lateral panel 94 and the second lateral panel 96 extend (e.g., orthogonally extend) from the door panel 92 to the inner end 80. The first lateral panel 94 and the second lateral panel 96 extend between and to the first longitudinal side 88 and the second longitudinal side 90. The first lateral panel 94 is spaced (e.g., laterally spaced) from the second lateral panel 96. The first lateral panel 94 and the second lateral panel 96 are disposed on opposing lateral sides of the bolt slot 102. The first lateral panel 94 may be disposed at (e.g., on, adjacent, or proximate) the bolt slot 102, at (e.g., on, adjacent, or proximate) the first lateral side 84, or between (e.g., laterally between) the bolt slot 102 and the first lateral side 84. Similarly, the second lateral panel 96 may be disposed at (e.g., on, adjacent, or proximate) the bolt slot 102, at (e.g., on, adjacent, or proximate) the second lateral side 86, or between (e.g., laterally between) the bolt slot 102 and the second lateral side 86.

Figure 5:
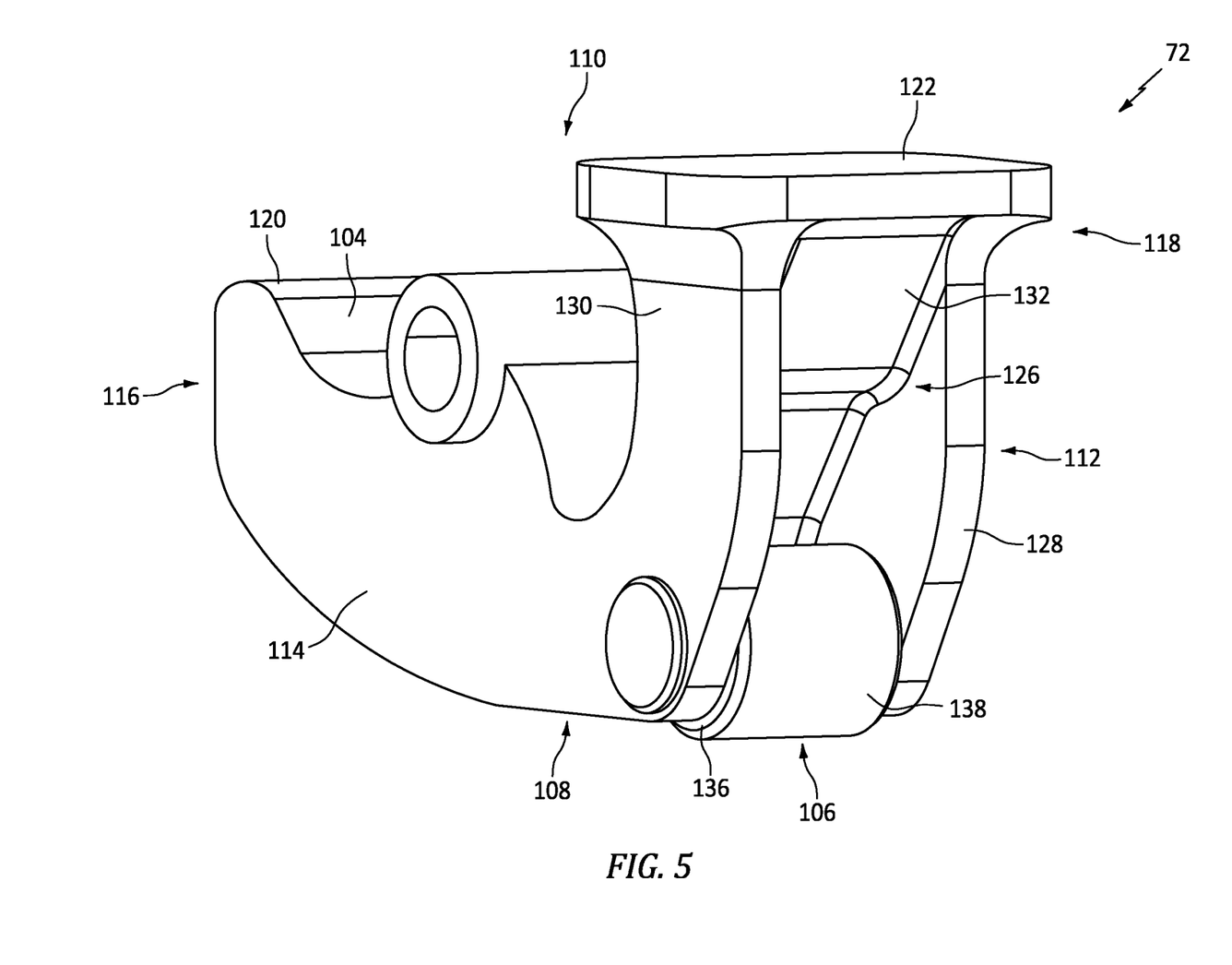
FIG. 5 illustrates a perspective view of a bolt for the pressure relief latch of FIG. 3, in accordance with one or more embodiments of the present disclosure.

FIGS. 3 and 5 illustrate portions of the bolt 72. The bolt 72 includes a bolt body 104 and a roller bearing 106. The bolt body 104 extends between and to an inner end 108 of the bolt body 104 and an outer end 110 of the bolt body 104. The bolt body 104 extends between and to a first lateral side 112 of the bolt body 104 and a second lateral side 114 of the bolt body 104. The bolt body 104 extends between and to a first longitudinal side 116 of the bolt body 104 and a second longitudinal side 118 of the bolt body 104. The bolt body 104 forms a first engagement surface 120 and a second engagement surface 122. The first engagement surface 120 is disposed at (e.g., on, adjacent, or proximate) the outer end 110 and the first longitudinal side 116. The second engagement surface 122 is disposed at (e.g., on, adjacent, or proximate) the outer end 110 and the second longitudinal side 118. The second engagement surface 122 extends along the outer end 110. The bolt body 104 may have a generally concave shape extending in the longitudinal direction between the first engagement surface 120 and the second engagement surface 122, with the concave shape generally facing away from the cam 74. The bolt body 104 is pivotably mounted to the housing body 78. For example, the bolt body 104 may be pivotably mounted to and disposed between (e.g., laterally between) the first lateral panel 94 and the second lateral panel 96. The bolt body 104 may be pivotably mounted to the first lateral panel 94 and the second lateral panel 96 at (e.g., on, adjacent, or proximate) the first longitudinal side 88. The bolt body 104 may be pivotably mounted to the housing body 78 at (e.g., on, adjacent, or proximate) a position between and spaced from the inner end 108 and the outer end 110 and between and spaced from the first longitudinal side 116 and the second longitudinal side 118. The concave shape of the bolt body 104 may face the position at which the bolt body 104 is pivotably mounted to the housing body 78. The bolt body 104 may be pivotably mounted to the housing body 78, for example, by a rivet, a bolt, or the like. As will be discussed in further detail, the bolt 72 (e.g., the bolt body 104) is configured to pivot relative to the housing body 78 about a pivot axis (e.g., a laterally-extending pivot axis) 124 between a latched position and an unlatched position. The bolt body 104 may be positioned in and/or pass through the bolt slot 102 as the bolt 72 pivots between the latched position and the unlatched position.

The bolt body 104 forms a cavity 126 of the bolt 72 at (e.g., on, adjacent, or proximate) and through the second longitudinal side 118 and the inner end 108. For example, the bolt body 104 may form a first lateral side wall 128, a second lateral side wall 130, and a laterally-extending wall 132 which form the cavity 126. The first lateral side wall 128 is disposed at (e.g., on, adjacent, or proximate) the first lateral side 112. The second lateral side wall 130 is disposed at (e.g., on, adjacent, or proximate) the second lateral side 114. The first lateral side wall 128 is spaced (e.g., laterally spaced) from the second lateral side wall 130. The laterally-extending wall 132 extends (e.g., laterally extends) from the first lateral side wall 128 to the second lateral side wall 130. The laterally-extending wall 132 is recessed from the second longitudinal side 118.

The roller bearing 106 is rotatably mounted to the bolt body 104 within the cavity 126. For example, the roller bearing 106 of FIGS. 3 and 5 is disposed between (e.g., laterally between) and rotatably mounted to the bolt body 104 at (e.g., on, adjacent, or proximate) the first lateral side wall 128 and the second lateral side wall 130. For further example, the roller bearing of FIGS. 3 and 5 is rotatably mounted to the bolt body 104 at (e.g., on, adjacent, or proximate) the inner end 108 and the second longitudinal side 118. The roller bearing 106 may be rotatably mounted to the bolt body 104, for example, by a rivet, a bolt, or the like. The roller bearing 106 is configured for rotation relative to the bolt body 104 about a rotational axis 134. The roller bearing 106 includes a cylindrical roller body 136 extending circumferentially about (e.g., completely around) the rotational axis 134. The roller body 136 forms a roller surface 138 forming an exterior surface of the roller body 136. The roller surface 138 extends circumferentially about (e.g., completely around) the rotational axis 134.

Figure 6A:
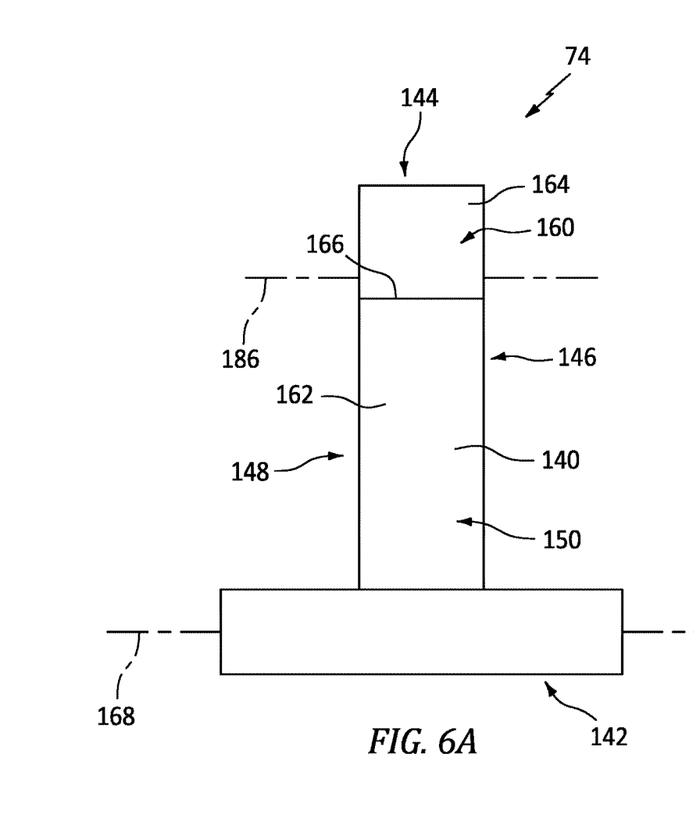
FIGS. 6A and 6B illustrate views of a cam for the pressure relief latch of FIG. 3, in accordance with one or more embodiments of the present disclosure.
Figure 6B:
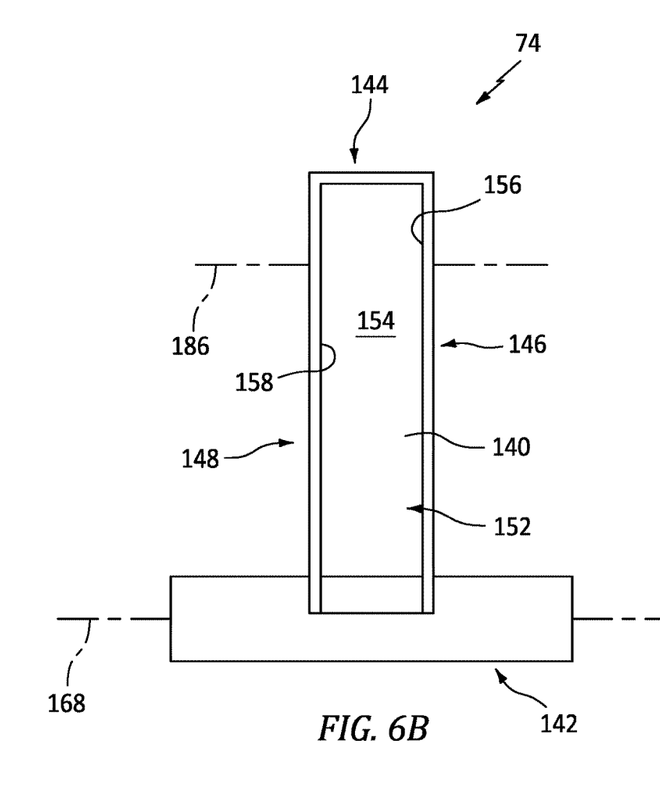

FIGS. 3, 6A, and 6B illustrate portions of the cam 74. The cam 74 includes a cam body 140. The cam body 140 extends between and to an inner end 142 of the cam body 140 and an outer end 144 of the cam body 140. The cam body 140 extends between and to a first lateral side 146 of the cam body 140 and a second lateral side 148 of the cam body 140. The cam body 140 extends between and to a first longitudinal side 150 of the cam body 140 and a second longitudinal side 152 of the cam body 140. The first longitudinal side 150 and the second longitudinal side 152 extend between and to the inner end 142 and the outer end 144. The cam body 140 may form a cavity 154 at the second longitudinal side 152. For example, the cam body 140 may form a first lateral side wall 156 and a second lateral side wall 158 which form the cavity 154. The first lateral side wall 156 is disposed at (e.g., on, adjacent, or proximate) the first lateral side 146 and the second longitudinal side 152. The second lateral side wall 158 is disposed at (e.g., on, adjacent, or proximate) the second lateral side 148 and the second longitudinal side 152. The first lateral side wall 156 is spaced (e.g., laterally spaced) from the second lateral side wall 158.

The cam body 140 forms a cam side surface 160 at (e.g., on, adjacent, or proximate) the first longitudinal side 150. The cam side surface 160 may extend between and to the inner end 142 and the outer end 144 along the first longitudinal side 150. The cam side surface 160 may extend between and to the first lateral side 146 and the second lateral side 148. The cam side surface 160 includes a first surface portion 162 and a second surface portion 164. The first surface portion 162 extends between the inner end 142 and the second surface portion 164. The second surface portion 164 extends between the outer end 144 and the first surface portion 162. The first surface portion 162 and the second surface portion 164 intersect at an actuation edge 166 of the cam body 140. The actuation edge 166 may extend laterally, for example, between and to the first lateral side 146 and the second lateral side 148. The first surface portion 162 may have a generally concave shape extending between the inner end 142 and the second surface portion 164. The first surface portion 162, however, may be flat (e.g., planar) or substantially flat at (e.g., on, adjacent, or proximate) the actuation edge 166. The second surface portion 164 may have a generally convex shape extending between the outer end 144 and the first surface portion 162. The second surface portion 164, however, may be flat (e.g., planar) or substantially flat at (e.g., on, adjacent, or proximate) the actuation edge 166. The intersection of the first surface portion 162 and the second surface portion 164 at the actuation edge 166 may form an orthogonal or substantially orthogonal shape (an angle of 90 degrees +/−20 degrees between the first surface portion 162 and the second surface portion 164) for the actuation edge 166.

The cam body 140 is pivotably mounted to the housing body 78. For example, the cam body 140 may be pivotably mounted to and disposed between (e.g., laterally between) the first lateral panel 94 and the second lateral panel 96 at (e.g., on, adjacent, or proximate) the inner end 80. The cam body 140 may be pivotably mounted to the housing body 78 at (e.g., on, adjacent, or proximate) the inner end 142. The cam body 140 may be pivotably mounted to the housing body 78, for example, by a rivet, a bolt, or the like. The cam body 140 is configured to pivot relative to the housing body 78 about a pivot axis (e.g., a laterally-extending pivot axis) 168.

FIG. 3 illustrates portions of the spring assembly 76. The spring assembly 76 of FIG. 3 includes a trunnion 170, a shaft 172, and a spring 174. The spring assembly 76 may additionally include an adjustment nut 176.

The trunnion 170 includes a trunnion body 178. The trunnion body 178 includes a laterally-extending body portion 180 and a longitudinally-extending body portion 182. The laterally-extending body portion 180 is pivotably mounted to the housing body 78. For example, the laterally-extending body portion 180 may be pivotably mounted to and disposed between (e.g., laterally between) the first lateral panel 94 and the second lateral panel 96 at (e.g., on, adjacent, or proximate) the inner end 80 and the second longitudinal side 90. The laterally-extending body portion 180 may be pivotably mounted to the housing body 78, for example, by a rivet, a bolt, or the like. The laterally-extending body portion 180 is configured to pivot relative to the housing body 78 about a pivot axis (e.g., a laterally-extending pivot axis) 184. The longitudinally-extending body portion 182 extends from the laterally-extending body portion 180 toward the cam 74. The longitudinally-extending body portion 182 may form a cylindrical body portion of the trunnion body 178. The longitudinally-extending body portion 182 may form an exterior threaded surface (e.g., for threaded engagement with the adjustment nut 176). However, the present disclosure is not limited to any particular shape of or threading for the longitudinally-extending body portion 182.

The shaft 172 extends between and connects the cam body 140 and the trunnion 170. The shaft 172 is pivotably mounted to the cam body 140. For example, the shaft 172 may be pivotably mounted to the first lateral side wall 156 and the second lateral side wall 158 coincident with the cavity 154 (e.g., with a portion of the shaft 172 disposed within the cavity 154). The shaft 172 may be pivotably mounted to the cam body 140 at (e.g., on, adjacent, or proximate) the outer end 144. The shaft 172 may be pivotably mounted to the cam body 140, for example, by a rivet, a bolt, or the like. The shaft 172 is configured to pivot relative to the cam body 140 about a pivot axis (e.g., a laterally-extending pivot axis) 186. The shaft 172 may be movably mounted to the trunnion body 178. For example, the shaft 172 may be configured to translate (e.g., linearly move; linearly slide) relative to and within the longitudinally-extending portion 182. Accordingly, at least a portion of a length of the shaft 172 may be disposed within the longitudinally-extending portion 182. The shaft 172 may form an enlarged portion 188, for example, at a lengthwise end of the shaft 172. The enlarged portion 188 may be understood to have a greater width relative to other lengthwise portions of the shaft 172. The enlarged portion 188 may be disposed within the cavity 154 and pivotably mounted to the cam body 140.

The spring 174 extends between and to a first spring end 190 and a second spring end 192. The spring 174 extends circumferentially about (e.g., completely around) portions of the shaft 172 and the trunnion body 178 (e.g., the longitudinally-extending portion 182). The spring 174 may extend between and to the shaft 172 (e.g., the enlarged portion 188) and the trunnion 170. For example, the first spring end 190 may be disposed in contact (e.g., fixed contact) with the enlarged portion 188 and the second spring end 192 may be disposed in contact (e.g., fixed contact) with the trunnion 170 (e.g., the laterally-extending portion 180 or the longitudinally-extending portion 182). Alternatively, the spring 174 may extend between and to the cam body 140 and the trunnion 170. For example, the first spring end 190 may be disposed in contact (e.g., fixed contact) with the cam body 140. The spring 174 is configured to bias (e.g., by spring compressive force) the shaft 172 and/or the cam body 140 away from the trunnion 170 and toward the bolt body 104.

The spring assembly 76 may additionally include the adjustment nut 176. The adjustment nut 176 may be configured to facilitate adjustment the spring 174 compression and, hence, the biasing force applied by the spring 174 to bias the cam body 140 away from the trunnion 170. The adjustment nut 176 may be threadably engaged with the trunnion 170 (e.g., the longitudinally-extending portion 182). The spring 174 may be positioned between and in contact with the adjustment nut 176 and the shaft 172 and/or the cam body 140. The adjustment nut 176 may be selectively positioned on the trunnion 170 (e.g., the longitudinally-extending portion 182) to control the compression of the spring 174. The adjustment nut 176 may include a locking screw 194 or other fastening mechanism configured to secure a position of the adjustment nut 176 relative to the trunnion 170 (e.g., the longitudinally-extending portion 182).

Figure 7:
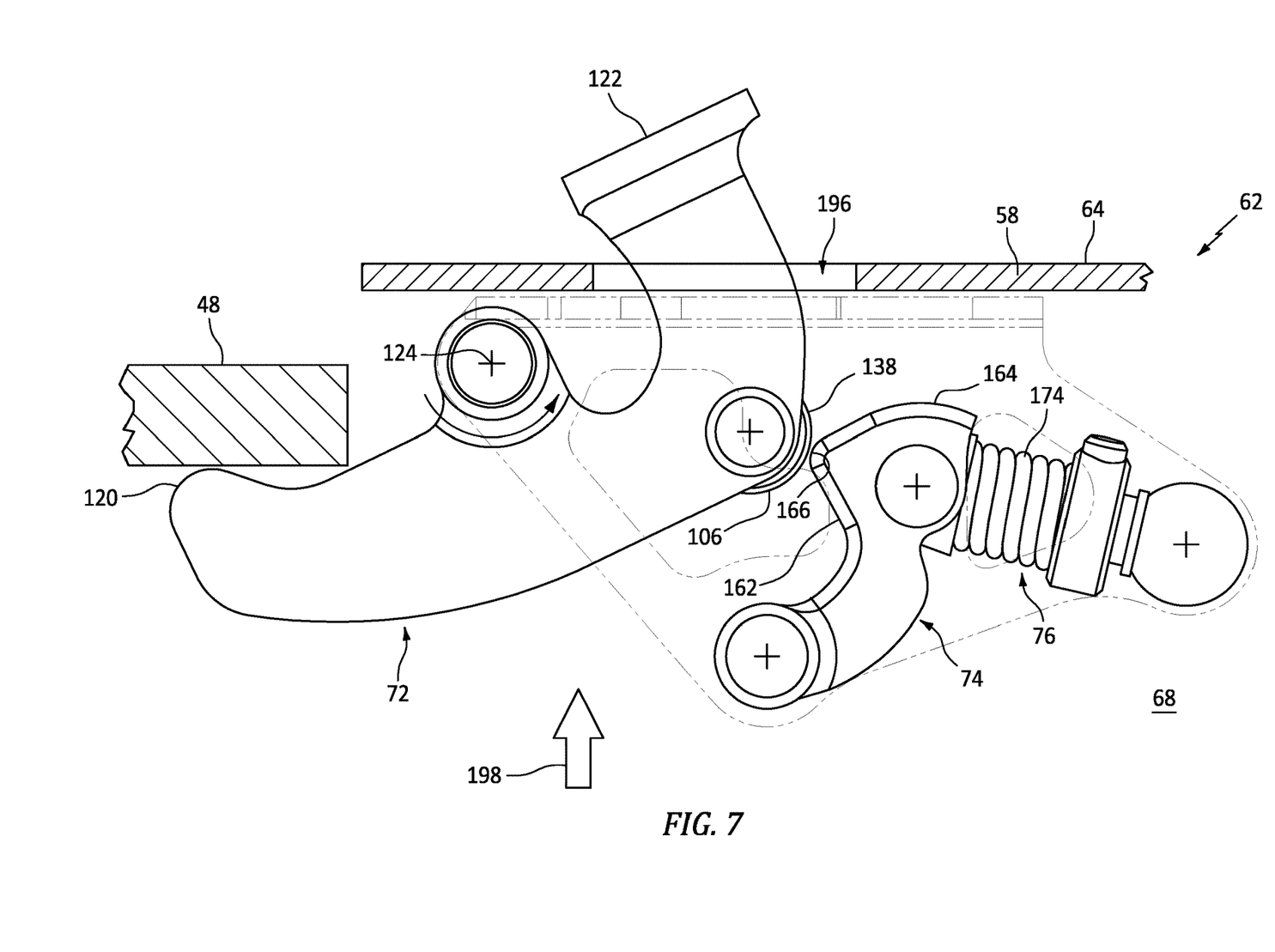
FIG. 7 illustrates a side, cutaway view of a pressure relief latch in an intermediate condition, in accordance with one or more embodiments of the present disclosure.
Figure 8:
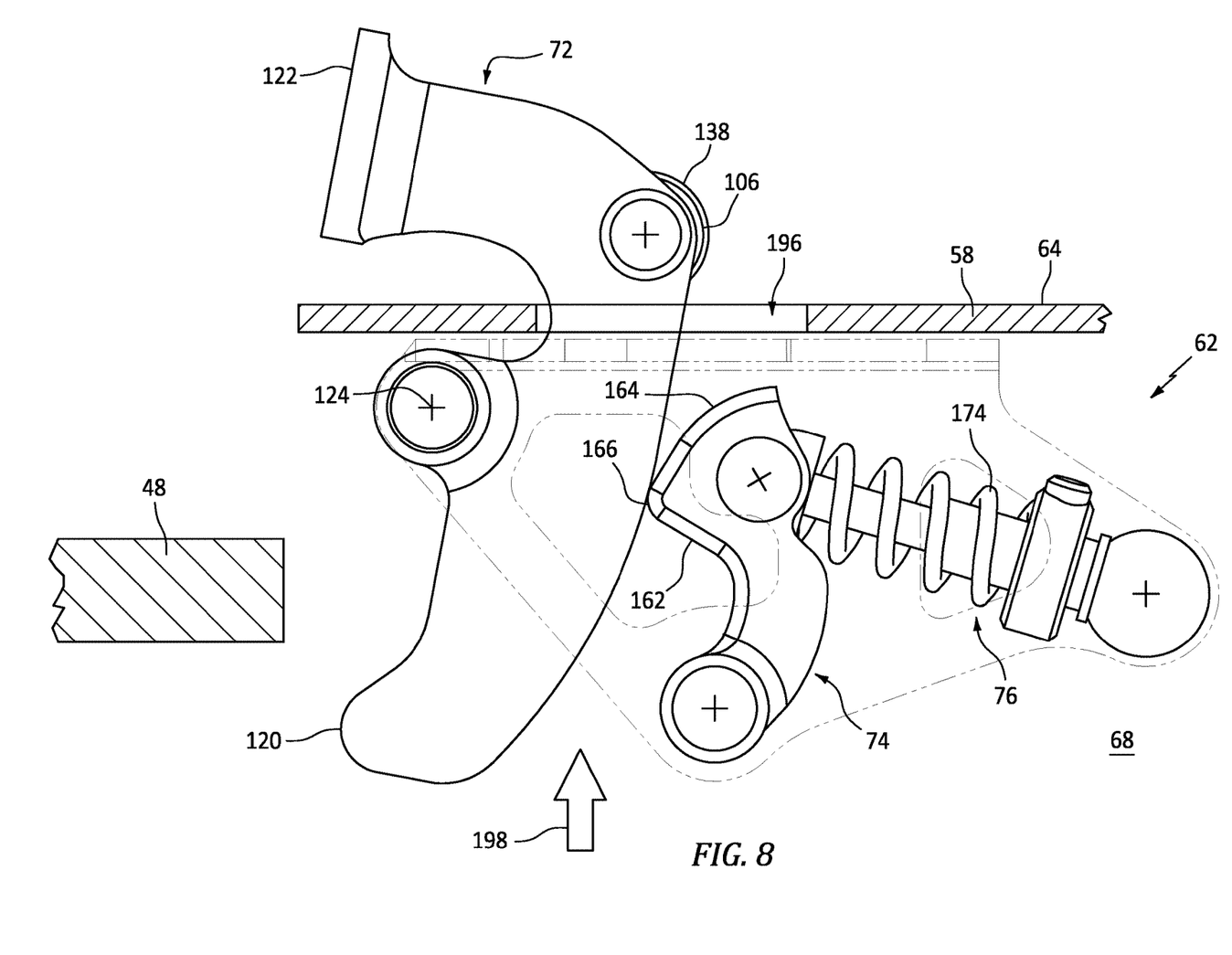
FIG. 8 illustrates a side, cutaway view of a pressure relief latch in an unlatched condition, in accordance with one or more embodiments of the present disclosure.

Referring now to FIGS. 3, 7, and 8, the operation of the pressure relief latch 62 will be described in greater detail. FIG. 3 illustrates a side, cutaway view of the pressure relief latch 62 in a latched condition (e.g., with the bolt 72 in the latched position). FIG. 8 illustrates a side, cutaway view of the pressure relief latch 62 in an unlatched condition (e.g., with the bolt 72 in the unlatched position). FIG. 7 illustrates a side, cutaway view of the pressure relief latch 62 in an intermediate condition.

As previously discussed, the pressure relief latch 62 of FIG. 3 includes the bolt 72 the latched position. In the latched position of the bolt 72, the first engagement surface 120 is disposed at (e.g., on, adjacent, or proximate) the core cowl 48 to prevent or otherwise obstruct pivoting of the pressure relief door 58 relative to the core cowl 48. In other words, the bolt 72, in the latched position, is configured to secure the pressure relief door 58 in the closed position. In the latched position of the bolt 72, the second engagement surface 122 is disposed at (e.g., on, adjacent, or proximate) the exterior surface 64. For example, the bolt body 104 and its second engagement surface 122 may be disposed within an opening 196 formed through the pressure relief door 58. In the latched position of the bolt 72, the cam 74 may contact one or more portions of the bolt 72. The first surface portion 162 of FIG. 3 is positioned in contact with the roller surface 138. The second surface portion 164 of FIG. 3 is positioned in contact with the laterally-extending wall 132. Contact between the bolt 72 and the cam 74 may facilitate retention of the bolt 72 in the latched position by resisting pivoting of the bolt 72 in a clockwise direction and/or a counterclockwise direction relative to the pivot axis 124. In other words, the cam 74 may positionally bias the bolt 72 in the latched position of the bolt 72.

FIG. 7 illustrates an intermediate condition of the pressure relief latch 62 (e.g., a condition between a fully latched condition and a fully unlatched condition). As pressure increases in the compartment 68 (e.g., due to a burst duct, fluid leak, or other cause of substantial pressure increase), the greater compartment 68 pressure relative to pressure outside the compartment 68 may apply a force 198 causing the pressure relief door 58 to begin to pivot toward the open position of the pressure relief door 58. A sufficiently large increase in pressure within the compartment 68, and the resulting force 198, may cause the first engagement surface 120 to contact and/or push against the core cowl 48, thereby cause the bolt 72 (e.g., the bolt body 104) to pivot about the pivot axis 124 (e.g., in a counter-clockwise direction, as shown in FIG. 7). The biasing force applied by the cam 74 and the spring assembly 76 to the bolt 72 will resist rotation of the bolt 72, as previously discussed. The roller bearing 106 (e.g., the roller surface 138) rolls along the first surface portion 162 toward the actuation edge 166, increasingly compressing the spring 174 and, therefore, increasingly resisting pivoting of the bolt 72 by the cam 74 and the spring assembly 76. A sufficiently large increase in pressure (e.g., a predetermined setpoint pressure for the pressure relief latch 62) within the compartment 68, and the resulting force 198, may cause the roller bearing 106 (e.g., the roller surface 138) to roll over the actuation edge 166 from the first surface portion 162 to the second surface portion 164. As the roller bearing 106 rolls over the actuation edge 166, the spring 174 expands causing the cam 74 to push against the bolt 72 with the roller bearing 106 (e.g., the roller surface 138) rolling along the convex second surface portion 164, thereby facilitating pivoting of the bolt 72 about the pivot axis 124 (e.g., in a counter-clockwise direction, as shown in FIG. 7).

FIG. 8 illustrates the pressure relief latch 62 in the unlatched condition. In the unlatched condition of FIG. 8, the pressure relief door 58 is free to pivot relative to the core cowl 48 (e.g., as a result of the force 198) without obstruction and/or engagement between the bolt 72 and the core cowl 48. The pressurized gas within the compartment 68 may cause the pressure relief door 58 to pivot relative to the core cowl 48 to allow the pressurized gas to escape the compartment 68 (e.g., into the bypass duct 50). The cam 74 may be pushed into contact with the bolt 72 (e.g., a portion of the bolt body 104 along the inner end 108) to retain the bolt 72 in the unlatched position. The bolt 72 may be repositioned in the latch position (see FIG. 3), for example, by depressing the second engagement surface 122, causing the roller bearing 106 to roll along the second surface portion 164, over the actuation edge 166, and onto the first surface portion 162.

The configuration of the bolt 72 and the cam 74 of the present disclosure pressure relief latch 62 facilitates a reduction in friction between pressure relief latch 62 components as the bolt 72 pivots from the latched position to the unlatched position, in comparison to at least some other pressure relief latches of which we are aware. In particular, the rolling engagement between the roller bearing 106 and the cam 74 (e.g., the first surface portion 162, the second surface portion 164, and the actuation edge 166) facilitates actuation of the bolt 72 from the latched position to the unlatched position with no (or negligible) sliding contact between the bolt 72 and the cam 74, which sliding contact may otherwise introduce substantial friction to pressure relief latch operation and degrade pressure relief latch performance and reliability.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

What is claimed is:

1. A pressure relief latch comprising:
a housing including a door panel, a first lateral panel, and a second lateral panel, the door panel forms a bolt slot, and the first lateral panel and the second lateral panel extend outward from the door panel;
a bolt including a bolt body and a roller bearing, the bolt body is pivotably mounted to the first lateral panel and the second lateral panel at a bolt pivot axis, the bolt body is pivotable about the bolt pivot axis between a latched position and an unlatched position, the bolt body is configured to pass through the bolt slot between the latched position and the unlatched position, the bolt body includes a first lateral side wall, a second lateral side wall, and a laterally-extending wall forming a cavity, the laterally-extending wall extends between and to the first lateral side wall and the second lateral side wall, the roller bearing is rotatably mounted to the first lateral side wall and the second lateral side wall about a rotational axis, and the roller bearing is disposed within the cavity;
a cam pivotably mounted to the first lateral panel and the second lateral panel at a first cam pivot axis, the cam includes a first surface portion, a second surface portion, and an actuation edge, and the first surface portion intersects the second surface portion at the actuation edge; and
a spring assembly pivotably mounted to the cam at a second cam pivot axis, the spring assembly is configured to bias the cam toward the bolt with the cam first surface portion positioned in contact with the roller bearing and the second surface portion positioned in contact with the laterally-extending wall in the latched position of the bolt body.

2. The pressure relief latch of claim 1, wherein the first surface portion has a concave shape and the second surface portion has a convex shape.

3. The pressure relief latch of claim 1, wherein the actuation edge has a substantially orthogonal shape.

4. The pressure relief latch of claim 1, wherein the spring assembly includes a shaft, a trunnion, and a spring, the shaft is pivotably mounted to the cam about the second cam pivot axis, the trunnion is pivotably mounted to the first lateral panel and the second lateral panel at a trunnion pivot axis, the shaft is mounted to the trunnion, the spring extends circumferentially about the shaft and the trunnion.

5. The pressure relief latch of claim 4, wherein the shaft is movably mounted to the trunnion such that the shaft is configured to translate relative to and within the trunnion.

6. The pressure relief latch of claim 4, wherein the spring assembly further includes an adjustment nut, the adjustment nut is selectively positionable on the trunnion, the spring is compressed against the adjustment nut.

7. The pressure relief latch of claim 4, wherein the roller bearing is configured to push the cam to compress the spring as the bolt body pivots from the latched position to the unlatched position.

8. A propulsion system for an aircraft, the propulsion system comprising:
a cowl forming a compartment;
a pressure relief door pivotably mounted to the cowl, the pressure relief door is pivotable between a closed position and an open position, and the pressure relief door further forms the compartment; and
a pressure relief latch including a housing, a bolt, a cam, and a spring assembly,
the housing includes a door panel, a first lateral panel, and a second lateral panel, the door panel is mounted to the pressure relief door, and the first lateral panel and the second lateral panel extend outward from the door panel;
the bolt includes a bolt body and a roller bearing, the bolt body is pivotably mounted to the first lateral panel and the second lateral panel at a bolt pivot axis, the bolt body is pivotable about the bolt pivot axis between a latched position and an unlatched position, in the latched position, the bolt body is configured to contact the cowl, the bolt body includes a first lateral side wall, a second lateral side wall, and a laterally-extending wall forming a cavity, the laterally-extending wall extends between and to the first lateral side wall and the second lateral side wall, the roller bearing is rotatably mounted to the first lateral side wall and the second lateral side wall about a rotational axis, and the roller bearing is disposed within the cavity;
the cam is pivotably mounted to the first lateral panel and the second lateral panel at a first cam pivot axis, the cam includes a first surface portion, a second surface portion, and an actuation edge, and the first surface portion intersects the second surface portion at the actuation edge; and
a spring assembly pivotably mounted to the cam at a second cam pivot axis, the spring assembly including a spring biasing the cam toward the bolt with the first surface portion positioned in contact with the roller bearing and the second surface portion positioned in contact with the laterally-extending wall in the latched position of the bolt body.

9. The propulsion system of claim 8, wherein:
the bolt body extends between and to a first longitudinal side and a second longitudinal side, the bolt body includes a first engagement surface and a second engagement surface, the first engagement surface is disposed at the first longitudinal side, the second engagement surface is disposed at the second longitudinal side;
in the latched position of the bolt body, the first engagement surface is configured to contact the cowl and the second engagement surface is configured to be disposed at the pressure relief door.

10. The propulsion system of claim 8, wherein the bolt body is configured to pass through the pressure relief door as the bolt body pivots from the latched positioned to the unlatched position.

11. The propulsion system of claim 8, wherein the roller bearing is positioned to push the cam to compress the spring as the roller bearing rolls along the first surface portion to the actuation edge.

12. The propulsion system of claim 8, wherein the actuation edge has a substantially orthogonal shape.

13. The propulsion system of claim 8, wherein the first surface portion has a concave shape and the second surface portion has a convex shape.

14. The propulsion system of claim 8, wherein the spring assembly includes a shaft and a trunnion, the shaft is pivotably mounted to the cam about the second cam pivot axis, the trunnion is pivotably mounted to the first lateral panel and the second lateral panel at a trunnion pivot axis, the shaft is mounted to the trunnion, the spring extends circumferentially about the shaft and the trunnion.

15. The propulsion system of claim 14, wherein the shaft is movably mounted to the trunnion such that the shaft is configured to translate relative to and within the trunnion.

16. The propulsion system of claim 14, wherein the spring assembly further includes an adjustment nut, the adjustment nut is selectively positionable on the trunnion, the spring is compressed against the adjustment nut.

17. The propulsion system of claim 8, wherein the roller bearing is configured to push the cam to compress the spring as the bolt body pivots from the latched position to the unlatched position.

* * * * *